United States Patent Office 3,787,508
Patented Jan. 22, 1974

3,787,508
SOLID, CURABLE POLYEPOXIDES MODIFIED WITH HYDROLYZED LIQUID POLYEPOXIDES
Eddie Bob Walker, Lake Jackson, Tex., assignor to The Dow Chemical Company, Midland, Mich.
No Drawing. Original application Oct. 25, 1968, Ser. No. 770,857, now Patent No. 3,632,836. Divided and this application Apr. 1, 1971, Ser. No. 130,540
The portion of the term of the patent subsequent to Oct. 8, 1985, has been disclaimed
Int. Cl. C07c 41/00
U.S. 260—613 R          3 Claims

ABSTRACT OF THE DISCLOSURE

A solid curable polyepoxide is rendered of greater reactivity to curing and esterification, while maintaining its other desirable properties by the addition thereto of minor amounts of hydrolyzed or partially hydrolyzed epoxide product, or by preparing a solid curable polyepoxide from a liquid epoxy resin by reacting the liquid resin with a diphenolic compound and a catalyst in the presence of said hydrolyzed product.

---

This application is a division of application Ser. No. 770,857, filed Oct. 25, 1968 and now Pat. No. 3,632,836.

BACKGROUND OF THE INVENTION

Field of the invention

Among the polyepoxides that are curable to give thermoset resins the solid polyepoxides have found a secure place and have become major articles of commerce. They are commonly cured by polyamines and polyamides or can be esterified with anhydrides or dicarboxylic acids and with long-chain aliphatic fatty acids. The latter provide solvent-soluble, paint-like substances often of great interest as pigment-suspending agents of superior adhesivity to, for example, flexing metal surfaces.

However, the epoxy resins have suffered, uniformly, the disadvantage of having only limited and, characteristically, slow reactivity in the curing and the esterification reactions. To enhance the rate of cure and reduce required curing temperatures and the like, it has become attractive to add a hydroxy-bearing reactive additive, such as a glycol. The desired increase in reactivity has oftentimes been obtained; however, some of the additives are of such volatility at the curing temperatures necessary for the cure of solid polyepoxides as to be impractical; some of the additives are of only limited capacity to be dissolved or dispersed in or with the solid, curable polyepoxide. Others have the disadvatage of severely reducing the duration of time that the uncured resin can be held without degradation ("shelflife") yet others depress the softening point, decrease chemical attack-resistance, and similarly degrade the resulting cured resin.

The inventor knows of attempts in his own laboratory in which phenols and bisphenols have been added to solid epoxy resins for the same purpose as the glycol, i.e. improving reactivity towards curing the epoxy group. The same disadvantages have been observed as mentioned above.

It has been desired to obtain a hydroxyl-bearing, property-improving additive for a solid polyepoxide which minimizes or eliminates the disadvantages hitherto encountered in the incorporation of such reactive additives into and with the curable solid polyepoxide. Such material is of interest in a solid polyepoxide, whether combined as an additive to an existing solid polyepoxide or incorporated into the reaction mixture during the preparation of a solid polyepoxide from liquid starting materials.

The prior art

The present inventor knows of no prior art near enough to the present invention to appeal to him as being significant. Illustrative of the art of the addition of hydroxyl-bearing substances to curable polyepoxides, is U.S. Pat. 2,728,744, to May et al., in which polyhydric alcohols such as ethylene glycol, glycerol, diethylene glycol, propylene glycol, glycerol mono-oleate, dipropylene glycol and the like are added to the epoxy resin. The amount added is critical, however, as too much causes the cured epoxy to be soft and rubbery which is undesirable. The only mention of hydrolysis of polyepoxides is of the undesired accidental hydrolysis that sometimes cannot be avoided.

DESCRIPTION OF THE PRESENT INVENTION

As a compatible, hydroxy-bearing additive to a curable polyepoxide system, typically a solid polyepoxide, there is provided a portion, typically representing a modest fraction, by weight of total mixture, of a hydroxyl-bearing product of the hydrolysis of an epoxide which yields homogeneous mixtures with the polyepoxide to which the additive is to be added. The actual amount of such hydrolysis product to be employed ranges from about 1 to about 20 weight percent of total mixture of the same with polyepoxide.

The epoxide to be hydrolyzed may very well be identical with, before hydrolysis, the solid epoxy resin to which it is to be added, or, alternatively, it may be the same as the low molecular weight epoxide from which the solid epoxy resin is made.

It can be seen that the hydrolysis product additive to be used according to the present invention represent a systematic opening of oxirane rings to form a hydroxyl-containing product. On this rationale, then, in all probability the employment of the hydrolysis product additives of the present invention in a curable polyepoxide of identity the same as or similar to that hydrolyzed, results, upon cure, in a product of substantially, if not precisely, the same identity as though no such hydrolysis product has been added; yet by reason of the hydrolysis and the presence of reactive hydroxyl groups therefrom the products modified according to the present invention show a substantially increased reactivity toward curing and esterification reactions, while at the same time maintaining good shelf life prior to curing.

The hydroxyl groups of the hydrolyzed epoxide are less reactive than the epoxy group, but the hydrolyzed epoxy resin apparently increases the rate of curing of the epoxy resin with amines. In the esterification of the epoxy it also influences the rate, but the OH groups contained therein also react with the acid or anhydride, although at a somewhat lesser rate than the epoxy ring-opening reaction.

While polyepoxides are usually the starting epoxides of choice for hydrolysis, closely related monoepoxides can be used, such as the monoglycidyl ether of phenol or of a bisphenol A.

The very common polyepoxides, based upon the diglycidyl ether of bisphenol A, are representatives; however, the diglycidyl ethers of, variously, bisphenol F, bisphenol K, bisphenol S, and such monoaromatic polyhydroxy phenols as resorcinol, hydroquinone, and catechol, are to be employed, as are also the novolacs which are reactive, hydroxyl-bearing products of partial reaction between a phenol and an aldehyde. The polyepoxides based upon all these substances, including the solid polyepoxides, typically obtained by reaction of a liquid polyepoxide with polyhydroxyaromatic substance and with also, for example, epichlorohydrin in the presence of an acceptor for the elements of hydrogen halide, are to be employed according to the present invention.

Hydrolysis of the polyepoxide

According to the present invention, the hydrolysis of the epoxide, which is usually a curable polyepoxide, is achieved with minimum of work-up difficulty, by the process which comprises the steps of dissolving the epoxide in a non-reactive solvent, adding thereto an aqueous solution of a water-soluble dicarboxylic lower aliphatic acid, and heating for a hydrolysis period of time at a hydrolytic temperature, and thereafter distilling to separate and remove water and solvent, after which the hydrolyzed epoxide product (now substantially no longer an epoxide but its glycol derivative by ring-opening) is recovered.

In more detail, a polyepoxide, to be hydrolyzed according to the present invention, is of the scope hereinbefore described wherein an average of at least more than one 1,2-epoxyalkyl groups is provided per aromatic nucleus. In theh monoepoxides, an average of about 1 or slightly less 1,2-epoxyalkyl groups per molecule is provided. It is critical that employed solvent be non-reactive, especially with the epoxy group of the starting material and the hydroxy group obtained by hydrolysis thereof. These conditions are conveniently met by the employment of an aromatic solvent or a ketone solvent which may be acetone, methyl ethyl ketone, methyl butyl ketone, and the like. Toluene, xylene, and the like can also be used. The amount of solvent with respect to the amount of polyepoxide is not critical except that the resulting solution should contain only a minimum of solvent, and must be of viscosity sufficiently low to permit access, at the molecular level, of the hydrolytic dicarboxylic lower aliphatic acid to substantially all of the epoxyalkyl groups of the polyepoxide. This condition is particularly met when solvent is present in such ratio to solute epoxide that the resulting solution contains from 25 to 75 parts by weight of total solution of the epoxide; within this range, the preferred limits are from 35 to 50 weight parts of resin, e.g. diglycidyl ether of bisphenol A, per weight of total solution. For efficacy in hydrolysis, and for substantial freedom from necessity for a special step to separate and remove catalytic acid, the preferred dicarboxylic acids to be employed are oxalic acid and malonic acid.

Acid concentrations as low as 0.1 weight percent of epoxy equivalent weight present, effectively hydrolyze the polyepoxides according to the present invention; however, the employment of larger amounts results in a more prompt hydrolysis. The upper limit of acid concentration to be employed depends primarily upon the materials of construction used in the equipment employed in the hydrolytic process. Little, if any, advantage is to be found in employing weights of acid in exces of 3 percent of epoxy equivalent weight present. Amounts in the range of 0.5–1, same basis, are preferred.

It is believed that the presence of water is essential to the instant hydrolysis, and the operative limits of water concentration, expressed as mole weight of water per mole weight of resin, range from an approximate minimum of 2 to a practical maximum of 40, with a preferred range between 10 and 20, same basis.

In carrying out the hydrolytic reaction according to the present invention, the epoxide is dissolved in, or at least, in effect, softened very significantly, with solvent and there is added thereto, with mixing and stirring, the aqueous solution of acid as hereinbefore defined. The resulting mixture is then placed in an autoclave and, therein, under seal, the resulting dispersion is heated at a temperature of from 50° to 374° C., for a period of time from 10 hours to 15 minutes, under at least autogenous pressure. Shorter times are adequate under higher pressures which permit temperatures in the upper part of the range.

The low molecular weight polyepoxides and phenyl glycidyl ether may be hydrolyzed in shorter times at the higher temperatures. Temperatures less than 374° C. are necessary to keep water as a liquid, thus providing a faster rate of hydrolysis.

The preferred limits are from 75° C. to 200° C. under at least autogenous pressure, for a period of from 6 hours to 15 minutes. Higher pressures may be preferred.

Under the preferred conditions, and in the substantial absence of inhibiting substances, the conversion of the epoxide starting material into its glycol hydrolytic product represents a conversion to the desired product of more than 99 percent. However, physical details of removal of product solution from the autoclave have characteristically rendered resulting apparent yields somewhat lower than this.

Upon completion of the heating and hydrolysis, as described, the resulting product is distilled, to separate and remove water and solvent. In standard distillations, the catalytic acid decomposes to entirely volatile decomposition products, which come off as gases. No other catalyst removal is needed. The resulting product is immediately employable as a compatible additive and diluent to a polyepoxide and catalytic acid can be ignored.

Upon the completion of distillation, the resulting product, warmed if desired to reduce viscosity, is employed as an additive to improve cure in a polyepoxide, useful in the modification of the properties of the uncured polyepoxide including the improvement of pigment dispersion in paints containing same, while maintaining good shelf-life.

Thus in one of its simpler and very useful embodiments, the hydrolysis product of this invention comprises essentially a 2,2-bis[4-(2,3-dihydroxypropoxy)phenyl]propane, which can be considered to be the glycol derivative from complete ring opening of the normal diglcidyl ether of bisphenol A.

The higher condensation products of bisphenol A and epichlorohydrin or of bisphenol A and the diglycidyl ether of bisphenol A may also be employed and are similarly hydrolyzed. The ring-brominated and ring-chlorinated derivatives are similarly prepared and used, as desired. Nevertheless, the preferred resins to be hydrolyzed and used to modify solid epoxy resins are the liquid epoxies as taught earlier in this specification.

Utilization of the hydrolyzed polyepoxide

More particularly, the hydrolytic product from the acid hydrolysis, as described, of a curable epoxide, can be combined with, and intimately blended into, a solid, curable polyepoxide to obtain a curable, solid epoxy resin of superior reactivity in curing and esterification reactions. Alternatively, the hydrolytic product can be added to the reaction mixture of liquid curable polyepoxide and polyhydroxyaromatic precursor reactant, and the resulting mixture caused to react, in the process of preparing a solid polyepoxide from a liquid polyepoxide, the resulting solid polyepoxide being of superior reactivity.

When the said hydrolytic product is to be added to an existing solid polyepoxide, either or both substances can be rendered more easily blended by warming, or by addition of solvent which can be xylene or a lower alkyl ketone such as methylisobutyl ketone, or both; or with the joint action of heating and solvent. It is among the advantages of the instant invention that homogeneous products are formed from such blending. The blended product is then adapted to be esterified with, for example, a fatty acid to obtain a product that is useful in a paint formulation.

When the said hydrolytic product is to be added to a reaction mixture for the preparation of a solid polyepoxide, it can be combined jointly with a curable liquid polyepoxide and a polyhydroxyaromatic material, the reaction of which, in the presence of the instant hydrolytic product, leads to preparation of a curable, solid polyepoxide having, by reason of the presence of the hydrolytic product, the superior properties to which the instant invention is directed. But for the presence of the hydrolytic product, such procedures follow the course of the prior art.

Thus, the product provided by the alternative processes of the present invention is, in one embodiment, a modified, curable epoxy resin composition comprising in combination a solid epoxy resin together with a minor amount of a hydrolyzed liquid epoxy resin wherein substantially all of the epoxy groups of said liquid resin have been hydrolyzed to vicinal hydroxy groups.

Whether an existing solid polyepoxide is to be modified, or a solid polyepoxide is to be synthesized in the presence of the hydrolysis product, the hydrolyzed product is employed in the amount of from about 1 to about 20 percent by weight of unmodified polyepoxide.

The present invention comprises a process for obtaining a derivative of a compound containing a 1,2-epoxyalkyl group in which derivative the said epoxyalkyl group is substantially fully hydrolyzed to a corresponding 1,2-dihydroxyalkyl group which process comprises the steps of dispersing said epoxyalkyl compound in admixture with water and with a hydrolysis catalytic amount of oxalic or malonic acid; heating to a hydrolytic interval of time in the substantial absence of air and under at least substantially autogenous pressure and thereafter distilling the resulting mixture under subatmospheric pressure at a temperature sufficient to cause the decomposition of said oxalic or malonic acid.

The invention is also in a curable modified polyepoxide composition comprising, in combination, a poly-1,2-epoxyalkyl first compound having an average of more than one 1,2-epoxyalkyl moieties per molecule together with a reactivity-improving amount of that poly-1,2-dihydroxyalkyl second compound of which all moieties are substantially the same as the moietal parts, other than 1,2-epoxyalkyl moieties, of said first compound, said reactivity-improving amount being an amount that is from about 1 to about 20 parts per hundred parts, all by weight, of the combined weight of said first and second compounds.

The foregoing aspects of the invention then lead to a resinous, solvent-soluble composition adapted to be employed as a paint vehicle, comprising essentially the fatty acid esterification product of a normally solid 1,2-epoxyalkyl compound reacted with a fatty acid to obtain a paint vehicle, modified by the intimate admixture thereinto of a 1,2-hydroxyalkyl compound obtained by hydrolysis of a 1,2-epoxyalkyl compound, that is adapted to be cured to obtain a thermoset coating.

The modified solid epoxy resins of this invention are also useful themselves, as the unesterified epoxy resin, in paint formulations, in adhesives and in potting resins as epoxy resins containing hydroxyl groups.

Having now fully described the present invention up to the point where the prior art supplied all further knowledge, I proceed to set forth the best embodiments thereof presently known to me.

EXAMPLE 1

Hydrolysis of a typical polyepoxide

A viscous, liquid, nearly colorless curable polyepoxide, substantially the diglycidyl ether of bisphenol A, was dispersed in an equal weight of methyl ethyl ketone, as solvent, employing 750 grams of each of the substances. To the resulting solvent solution was added 750 grams of a 0.5 weight percent solution in water of oxalic acid. The resulting mixture was placed in an autoclave, the atmosphere within the autoclave and above the reacting solution was purged with nitrogen and sealed under nitrogen, at a pressure of 100 pounds per square inch gauge.

The sealed autoclave was then heated to, and maintained at, a temperature of 135° C., during 5 hours.

At the end of this reaction period of time, the autoclave and contents were cooled below the boiling temperature and the pressure within the autoclave was relieved. Contents of the autoclave were then transferred to a 5 liter distillation flask, and placed under vacuum, and thereunder distilled at gradually increasing temperatures to an upper limit temperature of 180° C. At this upper limit temperature, the oxalic acid decomposed, and the decomposition products, being volatile, came over in the distillate, leaving 676 grams of product in the distillation flask. It was observed that, as a result of the entrainment of flask contents and adhesion to flask walls, there had been some purely mechanical loss in the various reaction and distillation systems employed; the yield of 676 grams represented 83.6 percent by weight of theoretical yield based on starting polyepoxide; most of the discrepancy from 100 percent being attributable to mechanical losses.

The resulting product was analyzed and found to contain no residual epoxy groups, 19.2 weight percent by weight of product of hydroxyl, and to have an average molecular weight of 440. The product had a Durran's softening point of 56°. The analyzed hydroxyl content of 19.2 percent may be compared with the theoretical value of a hypothetical product of the supposed reaction of 19.03.

Essentially indistinguishable results are obtained when employing malonic acid in place of oxalic acid.

EXAMPLE 2

Hydrolysis of a monoepoxide

In 750 grams of methyl ethyl ketone as solvent, 750 grams phenyl glycidyl ether was dissolved. To the resulting 1500 grams of monoepoxide solution, there were added 1800 grams of a 1 weight percent water solution of oxalic acid, and the resulting mixture well stirred and placed in an autoclave under nitrogen blanket. The pressure of nitrogen blanket was raised to 50 pounds per square inch gauge prior to heating. The resulting autoclave contents were then heated at 115° C. during one hour to bring about a hydrolytic reaction and obtain a product according to the present invention. At the conclusion of this time, the resulting mixture was permitted to cool to room temperature and transferred to distillation facilities. Distillation temperature was promptly elevated to 160° C., under vacuum, to vaporize and remove methyl ethyl ketone solvent and water; as a result of these procedures, there was obtained 634 grams of a glycol hydrolysis product according to the present invention, predominantly 3-phenoxy-1,2-propanediol. The product was analyzed and found to contain no residual epoxy moieties, to have a 21.9 weight percent content of hydroxyl groups and an average molecular weight of 170. For comparison, the molecular weight of 3-phenoxy-1,2-propanediol is, to a close approximation, 169. The figure of 21.9 weight percent of hydroxyl groups may be compared with the theoretical value of 22.3. The product had a 54° C. Durran's softening point. The yield, corrected for residues remaining in the autoclave, was 97.9 weight percent.

Other hydrolyses according to the present invention proceed in substantially the same manner. No particular adjustment need be made whether oxalic or malonic acid is the hydrolytic acid of choice.

EXAMPLE 3

Preparation of a solid polyepoxide of superior reactivity based upon liquid starting materials Into a reaction flask were charged 500 grams (2.592 equivalents) of a liquid polyepoxide, the diglycidyl ether of bisphenol A; therewith were combined 50 grams (0.55 equivalent) of the acid-hydrolyzed liquid polyepoxide prepared as in Example 1, foregoing. With these two substances were combined also 202.1 grams (1.772 equivalents) of bisphenol A itself.

The interior of the reaction vessel was flooded with nitrogen, and the mixture of substances was heated, to reduce their viscosity and make it easier to mix them together. Upon warming, they were mixed and stirred together to obtain an intimate mixture.

The said mixture was catalyzed, by the addition to it of 0.56 gram (0.075 percent by total weight of vessel charge) of N-methyl morpholine, as catalyst. The resulting mixture was heated at 150° C., at which point the reaction suddenly became exothermic; the application of external heat was discontinued, while the temperature of the charge in the reaction vessel continued to rise to 185° C.

Heating at a reaction temperature, between exotherm maximum and 150° C., was continued for 2 hours. At this point, the heating was discontinued, and the resulting mixture was placed under subatmospheric pressure whereby, at the indicated temperature, light fractions of unidentified substances were removed, and there remained an epoxy resin which, at room temperature, was a solid. The substance was examined analytically, and found to contain 4.6 weight percent of epoxide, having an epoxide equivalent weight of 935; it contained 5.7 weight percent total hydroxyl, 125 parts per million parts by weight of composition of hydrolyzable chlorides, an average molecular weight of 1215, and a Durran's softening point of 101° C.

EXAMPLE 4

The present example repeats Example 3, foregoing, except that the catalyst was sodium hydroxide, added in the amount of 25 parts per million parts by total weight of vessel charge.

Upon completion of the preparation of the desired solid polyepoxide, the product was analyzed. Analysis disclosed that the resulting resin contained 4.7 weight percent of epoxide by weight of total charge, corresponding to an epoxy equivalent weight of 915; 6 percent total hydroxyl, an average molecular weight of 1290, a Durran's softening point of 99° C., and a hydrolyzable chloride content of less than 100 parts by weight per million parts of vessel charge.

EXAMPLE 5

Into a reaction vessel, as in the examples foregoing, were charged 2000 grams (10.37 equivalents) of a liquid polyepoxide based upon bisphenol A, 200 grams (2.2 equivalents) of a product of the hydrolysis of a liquid polyepoxide based upon bisphenol A, the hydrolysis carried out as hereinbefore described; and 561.2 grams (4.915 equivalents) of bisphenol A.

To the resulting charge, in the flask, as catalyst, were added portions of 10 weight percent aqueous sodium hydroxide sufficient to supply 25 weight parts of the actual NaOH per million parts by weight of vessel charge. The resulting mixture was placed under vacuum, and all substances readily removed by volatilization were removed.

The resulting mixture was then heated to 165° C., whereupon autogenous reaction began and the temperature rose spontaneously to 195° C.

Temperature was maintained at reaction temperature over a period of 2 hours, whereupon the reaction was deemed to be complete, and the resulting product was worked up substantially as before, and examined.

The product was a polyepoxide, which was solid at room temperature, having 8.6 weight percent epoxy groups, an epoxide equivalent weight of 500, 4.7 weight percent total hydroxyl, an average molecular weight of 1195, and a Durran's softening point of 70° C. The hydrolyzable chloride content was less than 100 parts per million by weight of total resin.

In similar fashion, an epoxy novolac, a diepoxypolyoxyalkylene glycol, a polyepoxypolyhalobisphenol, or other known liquid curable polyepoxide is combined with portions of the product of its own hydrolysis in the manner of the instant invention, and with suitable portions of the polyol from which, by etherification, the polyepoxide is a derivative. This mixture is catalyzed in known manner, as with, for example, a basic tertiary-amine heterocycle or an alkali metal hydroxide such as sodium hydroxide. Reaction is induced by heating. Following reaction, solvents and other extraneous matter are removed by vaporization.

The products, curable polyepoxides that are solid at room temperature, are easily reacted with a long-chain fatty acid to obtain a solvent-soluble esterified epoxy resin adapted to be employed in a varnish or in a paint formulation.

The unesterified product containing the hydroxyl group can also be used in paint formulations with excellent results in suspending pigment. They are also useful in other common applications of epoxies such as in laminates and adhesives.

EXAMPLES 6-8

In the following examples the modified epoxy resins were tested in a paint formulation to determine their effect on pigment dispersion.

To 67.5 g. of the solid epoxy resin dissolved in an equal weight of a solvent containing approximately equal volumes of methyl isobutyl ketone, xylene and diacetone alcohol was added 75 g. $TiO_2$ and 6 g. black iron oxide. The mixture was ball-milled for 22 hours. This paint was placed on wood tongue depressors by dipping them into the resulting dispersions to a depth of 1½ inches after which they were laid on a flat surface to dry. Two hours after dipping, the dispersion on one-half the upper (exposed) surface of each sample was wiped off. Pigment dispersion is determined by comparing the newly exposed surface with the original surface. If the color is the same the pigment dispersion is good; a poor pigment dispersion is indicated by a color darker than the original which is caused by settling of the pigment. The samples were rated on the basis of color and general appearance and assigned numbers from 0-5 (the higher the number, the better the dispersion).

The solid resins used in these examples were polyepoxides prepared by reacting the diglycidyl ether of bisphenol A with bisphenol A. The hydrolyzed liquid polyepoxide prepared in Example 1 was added to the reaction mixture.

| Example Number | EEW [1] of resin | Wt. percent hydrolyzed liquid resin | Dispersion rating |
|---|---|---|---|
| 6 | 514 | 0 | 2 |
| 7 | 502 | 1.56 | 4 |
| 8 | 500 | 7.2 | 5 |

[1] Epoxide equivalent weight.

Example 6, as shown in the above table, had no hydrolyzed resin added with the consequent low dispersion rating.

The products of Examples 7 and 8 were prepared in the manner of Example 3. Substantially the same product can be obtained by melting, or dissolving in an appropriate solvent, the solid resin (obtained by the reaction of bisphenol A and the diglycidyl ether of bisphenol A in the absence of the hydrolyzed resin) and then adding the desired amount of liquid hydrolyzed resin.

EXAMPLE 9

A solid epoxy resin modified by the addition thereto of 6.59% by weight of the hydrolyzed liquid resin of Example 1, and having an EEW of 935 was esterified by adding 250 g. of the modified epoxy resin to an equal weight of a commercial grade of linseed oil fatty acids having an acid number of 197-204 and sp. gr. of .901-.905. Xylene was added to azeotrope the water formed and the esterification was conducted at a temperature of 250° C. for a period of 5 hours at which time the acid number was reduced to a value of 5. Comparison of this esterification with one conducted on the same resin, excepting for the addition of the hydrolyzed resin, showed that the time required was 7¼ hours.

The products of this example were employed as coatings on the surfaces of metals and the ones containing the hydrolyzed resin were found to exhibit substantially better impact resistance (a measure of adhesion) than did coatings prepared from the unmodified esterified epoxy resins.

In the manner of Example 9 other fatty acid esters of the epoxy resin can be prepared by using various commerically available fatty acid derivatives of soybean, tung, fish and dehydrated castor oils.

I claim:

1. The process for obtaining a derivative of a compound containing a 1,2-epoxyalkyl group in which derivative the said epoxyalkyl group is substantially fully hydrolyzed to a corresponding 1,2-dihydroxyalkyl group which process comprises the steps of dispersing said epoxyalkyl compound in admixture with water and with from about 0.1 to about 3 percent by weight of oxalic or malonic acid based on epoxy equivalent weight;

heating to a temperature of from about 50° to about 374° C. for a time of from about 15 minutes to about 10 hours in the substantial absence of air and under at least substantially autogenous pressure; and thereafter distilling the resulting mixture under subatmospheric pressure at a temperature sufficient to cause the decomposition of said oxalic or malonic acid and to remove water and decomposition products.

2. The process of claim 1 in which said compound containing a 1,2-epoxyalkyl group is first admixed with a non-reactive solvent, said solvent being of amount sufficient to reduce materially the viscosity of said compound and such that the resulting solution contains from about 25 to about 75 parts by weight of said epoxyalkyl compound.

3. The process for containing 2,2-bis{4-(2,3-dihydroxypropoxy)phenyl} propane which process comprises the steps of dispersing the glycidyl ether of bisphenol A in admixture with water and with from about 0.5 to about 1 percent by weight of oxalic or malonic acid based on epoxy equivalent weight;

heating to a temperature of from about 75° to about 200° C. for a time of from about 15 minutes to about 6 hours in the substantial absence of air and under at least substantially autogenous pressure and thereafter distilling the resulting mixture under subatmospheric pressure at a temperature sufficient to cause the decomposition of said oxalic or malonic acid and to remove water and decomposition products.

References Cited

UNITED STATES PATENTS 3,405,093   10/1968   Walker _____ 260—613 R X

BERNARD HELFIN, Primary Examiner

U.S. Cl. X.R.

260—613 D

PO-1050
(5/69)

UNITED STATES PATENT OFFICE
CERTIFICATE OF CORRECTION

Patent No. 3,787,508          Dated January 22, 1974

Inventor(s) Eddie Bob Walker

It is certified that error appears in the above-identified patent and that said Letters Patent are hereby corrected as shown below:

Col. 10, line 4, "containing" should be changed to --obtaining--

Signed and sealed this 22nd day of October 1974.

(SEAL)
Attest:

McCOY M. GIBSON JR.            C. MARSHALL DANN
Attesting Officer              Commissioner of Patents

Dedication 3,787,508.—*Eddie Bob Walker*, Lake Jackson, Tex. SOLID, CURABLE POLYEPOXIDES MODIFIED WITH HYDROLYZED LIQUID POLYEPOXIDES. Patent dated Jan. 22, 1974. Dedication filed Apr. 4, 1977, by the assignee, *The Dow Chemical Company*.

Hereby dedicates to the Public the entire term of said patent.

[*Official Gazette July 12, 1977.*]